(12) United States Patent
Feller

(10) Patent No.: US 7,870,793 B1
(45) Date of Patent: *Jan. 18, 2011

(54) TRANSIT TIME FLOW SENSOR WITH ENHANCED ACCURACY

(76) Inventor: Murray F Feller, 21577 NW. 75th Ave. Rd., Micanopy, FL (US) 32667

(*) Notice: Subject to any disclaimer, the term of this patent is extended or adjusted under 35 U.S.C. 154(b) by 0 days.

This patent is subject to a terminal disclaimer.

(21) Appl. No.: 12/650,347

(22) Filed: Dec. 30, 2009

Related U.S. Application Data

(63) Continuation-in-part of application No. 12/626,890, filed on Nov. 28, 2009, now Pat. No. 7,823,463.

(51) Int. Cl.
*G01F 1/66* (2006.01)
(52) U.S. Cl. .................................. 73/861.27
(58) Field of Classification Search .. 73/861.26–861.27
See application file for complete search history.

(56) References Cited

U.S. PATENT DOCUMENTS

| 6,973,842 | B1 * | 12/2005 | Feller | 73/861.27 |
| 7,044,000 | B2 * | 5/2006 | Feller | 73/861.27 |
| 7,201,065 | B1 | 4/2007 | Feller | |
| 7,568,398 | B2 | 8/2009 | Feller | |

* cited by examiner

*Primary Examiner*—Jewel Thompson
(74) *Attorney, Agent, or Firm*—David Kiewit

(57) ABSTRACT

Ultrasonic transit time flow meters using transducers mounted on insertion probes spaced apart along a pipe axis provide an economical way to measure fluid flow. The accuracy of these flow meters can be improved by providing additional transducers to measure the current speed of sound of a working fluid; the actual spacing of the probes; and the diameter of the pipe through which the fluid is flowing.

16 Claims, 3 Drawing Sheets

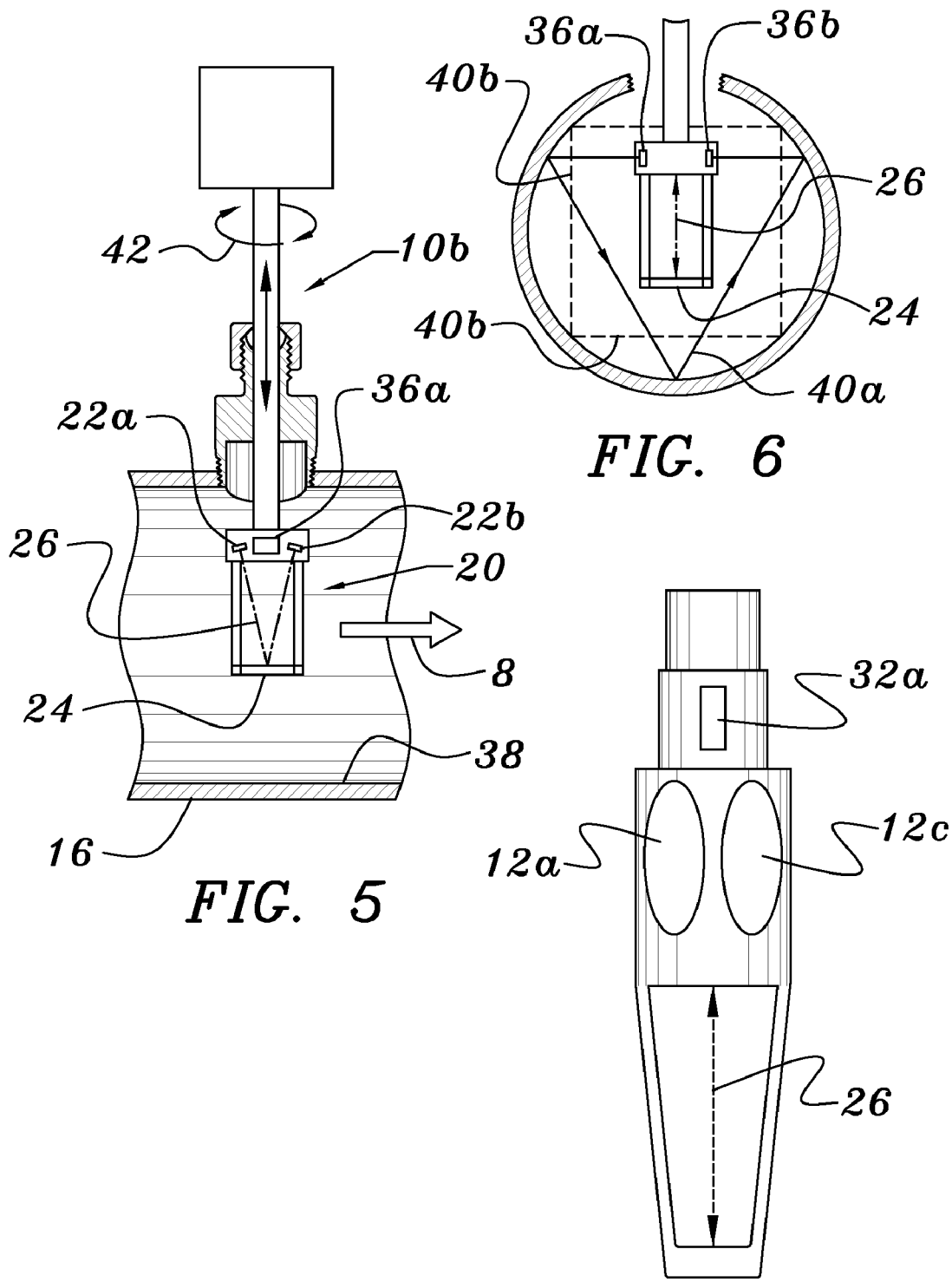

TRANSIT TIME FLOW SENSOR WITH ENHANCED ACCURACY

BACKGROUND OF THE INVENTION

This application is a continuation-in-part of the inventor's U.S. Ser. No. 12/626,890, filed on Nov. 28, 2009.

FIELD OF THE INVENTION

The invention generally relates to flow measurement instruments of the ultrasonic transit time sort. More specifically, it relates to apparatus and method for improving the accuracy of such instruments.

BACKGROUND INFORMATION

Ultrasonic transit time flow meters determine the rate of flow of a fluid by measuring the difference between upstream and downstream transit times of acoustic signals propagated along the flow direction. In order to determine the flow rate from the measured time difference, one must know precisely both the speed of sound in the fluid and the acoustic path length. Moreover, in order to determine volumetric flow rate, one must also know the cross-sectional area of the flow channel.

In addition to dimensional uncertainties, most transit time flow meters have to deal with changes in the speed of sound in the working fluid. Such changes may occur as a result of changes in temperature or in the chemical composition of the working fluid.

In some transit time flow measurements the difference between the upstream and downstream transit times exceeds the range of carrier phase detection so that the measured time differential can be ambiguous. This ambiguity can lead to serious measurement errors.

Full-bore flow meters are often selected for high accuracy measurements because both the size of the flow channel and the distance over which flow is being measured (e.g., a spacing between upstream and downstream transducers) are designed into the equipment.

Flow meters configured as probes that are insertable into a flow stream are commonly both less expensive than full-bore meters and easier to install and service. However, their accuracy can be compromised by differences between actual and nominal values of the probe-to-probe spacing and the internal diameter of a pipe. In his U.S. Pat. No. 6,973,842, the inventor describes an approach to resolving both of these issues by using a single probe carrying both a first set of transducers defining a first acoustic beam having a component along the pipe axis and a pair of pipe size-measuring transducers defining a second acoustic beam in a plane perpendicular to the pipe axis. A shortcoming of this arrangement is that the total length of the first acoustic beam was restricted by the maximum diameter of a probe. This length is less than acoustic beam lengths that can easily be achieved by using multiple probes spaced apart along a flow direction.

BRIEF SUMMARY OF THE INVENTION

The invention provides apparatus and method to improve the accuracy of transit time flow meters comprising upstream and downstream probes spaced apart along a pipe. Each of these probes comprises at least one respective transducer paired with a respective transducer on the other probe. Each of these pairs of transducers is operable to define a respective acoustic beam directed entirely or partially along the axis of the pipe and extending between the probes.

Sought-after improvements are obtained by separately measuring one or more of: the speed of sound in the working fluid; the distance along the pipe axis between the two probes; the diameter of the pipe; and a transit time difference.

One aspect of the invention is that it provides an acoustic signal return leg comprising at least one transducer on one of the two probes. The return leg transducer is operable to define an acoustic beam having both its ends on the selected one of the probes.

In one return leg embodiment the return leg is configured as a 'sounder' in which a single transducer both generates and receives an acoustic signal projected along a beam extending between the return leg transducer and a reflector. Because the dimensions of the probe are well controlled, this sounder arrangement provides a direct measurement of the speed of sound.

In another return leg embodiment, the return leg comprises at least two transducers arranged to generate a return leg acoustic beam comprising a component parallel to the axis of the pipe and another component perpendicular to the axis of the pipe. A probe arrangement of this sort is described by the inventor in his U.S. Pat. No. 7,568,398. In this embodiment of the present invention the return leg provides a direct measurement of the speed of sound, as well as an approximate transit time measurement that can be used to disambiguate a phase-based transit time measurement along the axial acoustic path extending between the two probes.

In U.S. Ser. No. 12/626,890, the inventor describes a transit time flow sensor comprising upstream and downstream probes spaced apart along a pipe and rotatable about respective axes to define a quasi-helical acoustic beam that reflects multiple times from the inside surface of the pipe. In arrangements of this sort both the pipe diameter and the distance between the probes must be determined accurately in order to establish the acoustic path length. Moreover, in these flow meters each probe comprises a respective head portion streamlined along a respective elongation direction perpendicular to an axis of the respective probe. Each probe further comprises at least one flow-measuring transducer having a respective center displaced a respective length along the elongation direction from the respective probe axis and skewed with respect to the respective elongation direction by a respective selected skew angle.

In one preferred embodiment of a flow meter using a quasi-helical beam extending between two probes, each probe further comprises a respective axial spacing measuring transducer operable to define, with another axial spacing measuring transducer disposed on the other probe, a straight acoustic beam parallel to the axis of the pipe when the respective elongation direction of each probe head is parallel to the pipe axis.

In another preferred embodiment of a flow meter using a quasi-helical beam extending between two probes at least one of the probes further comprises at least one return leg transducer. This return leg transducer is operable to define an acoustic beam having both its ends on the at least one of the probes.

Although it is believed that the foregoing rather broad summary description may be of use to one who is skilled in the art and who wishes to learn how to practice the invention, it will be recognized that the foregoing recital is not intended to list all of the features and advantages. Those skilled in the art will appreciate that they may readily use both the underlying ideas and the specific embodiments disclosed in the following Detailed Description as a basis for designing other arrangements for carrying out the same purposes of the present invention and that such equivalent constructions are within the spirit and scope of the invention in its broadest form. Moreover, it may be noted that different embodiments of the invention may provide various combinations of the recited features and advantages of the invention, and that less than all of the recited features and advantages may be provided by some embodiments.

BRIEF DESCRIPTION OF THE SEVERAL VIEWS OF THE DRAWING

FIG. 4 is a view taken perpendicular to the flow direction of the probe of FIG. 3.

FIG. 5 is a side view, taken along the flow direction, of a probe comprising separate axial spacing, return leg, and pipe size measuring transducers.

FIG. 6 is a side view, taken perpendicular to the flow direction, of the apparatus similar to that of FIG. 5

DETAILED DESCRIPTION OF A PREFERRED EMBODIMENT

In studying this Detailed Description, the reader may be aided by noting definitions of certain words and phrases used throughout this patent document. Wherever those definitions are provided, those of ordinary skill in the art should understand that in many, if not most instances, such definitions apply to both preceding and following uses of such defined words and phrases.

The ensuing disclosure will describe various arrangements for generating acoustic beams extending between probes spaced out along the axis of a pipe or other flow conduit. The beams extending between spaced apart probes are generally referred to as 'axial beams' although they may have both axial and transverse components. In some cases the axial beams may be strictly parallel or along the pipe axis. In other cases they may have a transverse component and reflect several times from an internal surface of the pipe. Conversely, beams referred to as being 'transverse' have a predominant component perpendicular to a flow direction or pipe axis, but may comprise a component parallel to the axis. Additionally, it is to be understood that a 'return leg' acoustic beam is a beam having both its ends on a single probe and is distinct from any axial beam extending between probes.

Figure 1:
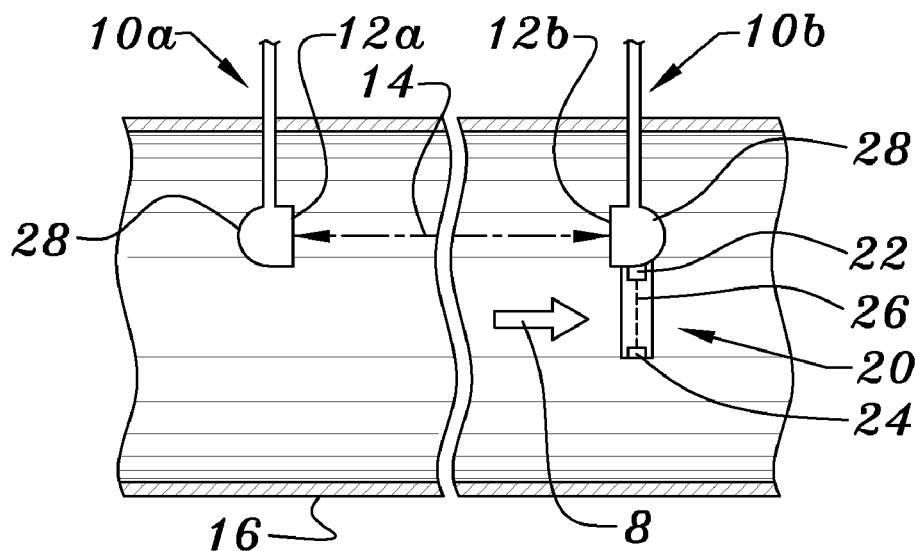
FIG. 1 is a partly schematic depiction of an ultrasonic flow sensor in which a first acoustic beam parallel to a flow direction extends between two probes and a second, return leg, acoustic beam extends perpendicular to the flow direction on one of the two probes.

Turning now to FIG. 1, one finds a white arrow 8 indicating fluid flowing from an upstream 10a to a downstream 10b probe spaced apart along an axis of a pipe 16. Each of the probes has a respective transducer 12a, 12b facing another transducer on the other probe in a 'head-on' arrangement that allows the transducers to define an acoustic transit time beam 14 parallel to or along the axis of the pipe 16. The accuracy of these measurements is limited by the accuracy with which the spacing between transducers and the speed of sound in the fluid are known.

The spacing between paired transducers on separate probes often differs from a selected design value because of limits on how precisely insertion fittings can be placed along a pipe. The measurement span is proportional to distance between probes so that changes in the distance lead to corresponding changes in transit times. Thus, measurement of the probe-to-probe spacing is important.

The speed of sound of a working fluid can change over time due to variations in temperature, pressure, and composition of the fluid. For example, a heat transfer system using a water-glycol solution can experience a change in acoustic propagation speed if the composition is changed.

In order to correct for inaccuracies in spacing, one may modify a transit time flow meter by adding a signal return leg 20 to one or more of the probes and use that return leg to measure the speed of sound and, in some cases, to provide a separate flow rate measurement.

Figure 2A:
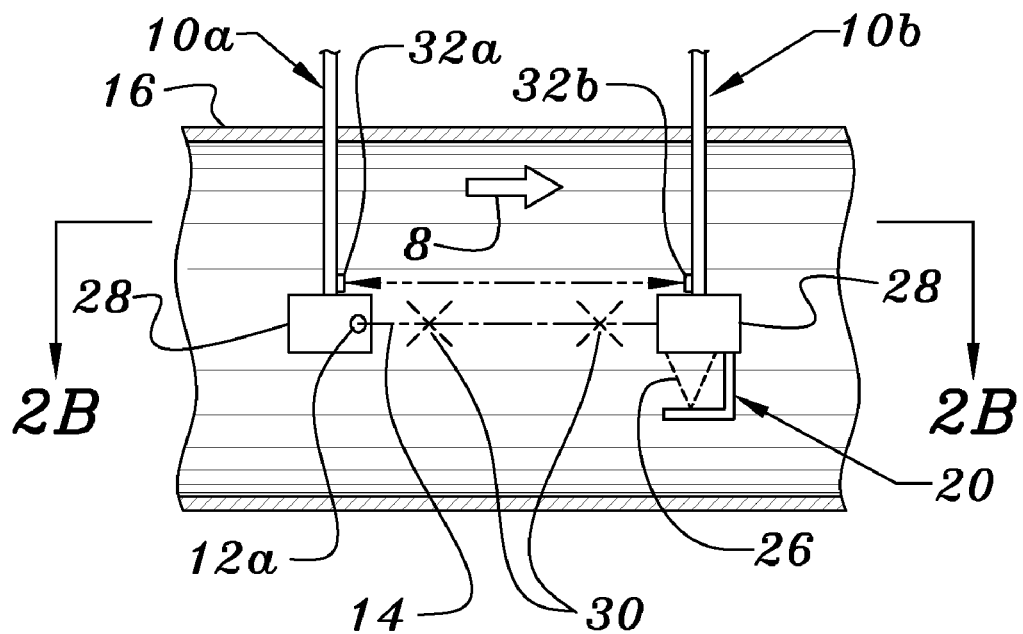
FIG. 2A is a schematic sectional view of two probes having both facing and skewed flow measurement transducers, and set in a diametral plane of the pipe, the view taken in a plane including an axis of the pipe and the stems of the two probes.
Figure 2B:
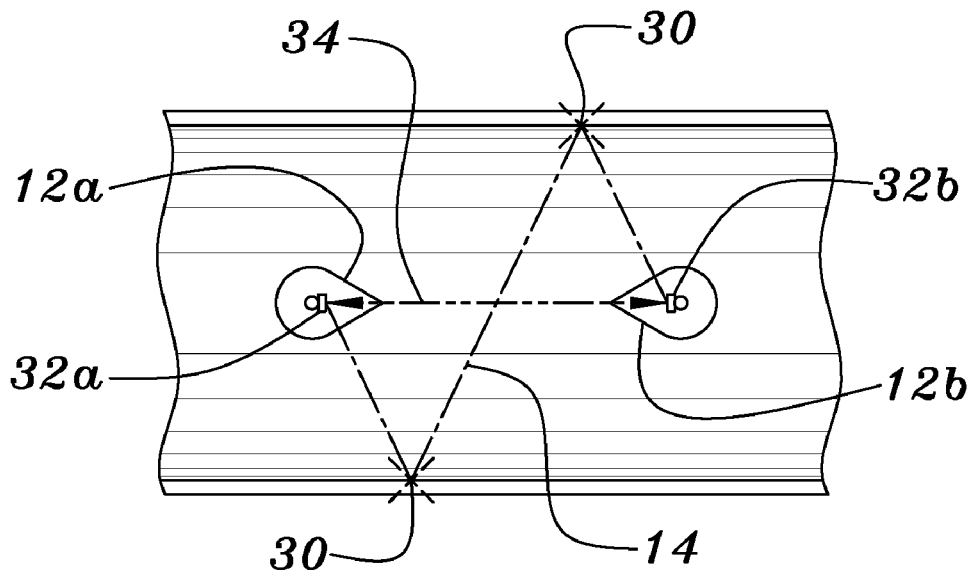
FIG. 2B is a schematic sectional view of the apparatus of FIG. 2A, the view taken as indicated by the double-headed arrow 2B-2B in FIG. 2A.

In the depiction of FIG. 1 a return leg 20 is added to the downstream probe 10b. This leg, in the simplest case, may comprise a single transducer 22 and a reflector 24. These elements, in the depiction of FIG. 1, define a return leg acoustic beam 26 extending perpendicular to the flow direction over a distance that can be accurately controlled and defined during manufacture of the probe. Thus, the return leg of FIG. 1 is operable to provide an accurate measure of the current speed of sound in the working fluid. This measured speed of sound can be used with an average transit time measurement to provide a measure of the probe-to-probe spacing. This improves the measurement accuracy of head-on transit time apparatus. Alternately, separate transducers can be used for the probe-to-probe spacing measurement, as shown in FIGS. 2A and 2B The term 'return leg' in the foregoing denotes a structure comprising at least one transducer and some sort of signal return mechanism that jointly define a separate beam in the working fluid. In the simplest case, sometimes called a 'sounder', the signal return mechanism can be a passive reflector 24, as depicted in FIGS. 1, 5 and 6. Alternately, one can define a beam between two or more transducers. In a particular embodiment depicted in FIG. 3 the plurality of interconnected return leg transducers 22a, 22b, 22c, 22d can be used to provide a longer acoustic path. Similar measurement arrangements are taught in detail in the inventor's U.S. Pat. No. 7,568,398.

The reader will note that although the return leg could be added to either, or both, of the probes depicted in FIG. 1, a preferred arrangement calls for the return leg to be located only on the downstream probe 10b. A return leg on the upstream probe might produces flow perturbations, such as vortices, in the axial acoustic beam, which may decrease the accuracy of the measurement.

Turning now to FIGS. 2A and 2B, one finds a depiction of a transit time flow measuring arrangement similar to what is described in the inventor's U.S. patent application Ser. No. 12/626,890. The metering arrangement comprises upstream 10a and downstream 10b probes having head portions 28 streamlined along respective elongation directions selectively set parallel to the axis of a pipe. A single transducer 12a, 12b on each probe is paired with another transducer 12b, 12a on the other probe and is skewed with respect to the respective elongation direction by a selected skew angle so that the axial acoustic beam 14 comprises a component transverse to the axis. These two transducers define an acoustic flow measurement beam that reflects several times from an interior surface of the pipe. In this and other figures, such an axial beam is shown as a dot-dash, or multi-dot-dash line, and the points of reflection from an internal surface of the pipe are shown with 'sunburst' icons 30.

In addition to the skewed flow measuring transducers, FIGS. 2A and 2B depict a signal return leg 20 as well as a pair of axial spacing transducers 32a, 32b used to generate a second axial beam 34. The beam 34 is parallel to the pipe axis and extends between the probes for determining the probe-to-probe spacing when the speed of sound is established (e.g., by use of the return leg 20).

In a preferred embodiment, the axial spacing transducers 32a, 32b are substantially smaller than the skewed flow measurement transducers 12a, 12b and are correspondingly operated at a higher frequency (e.g., 4 MHz versus 1 MHz). The choice of smaller transducer size minimizes flow perturbations induced by the bluff face of the depicted axial spacing transducers.

In the interest of clarity of presentation, the depiction in FIGS. 2A and 2B is of a special case in which skewed transducers on the two probe heads are set to generate a beam in a diametral plane. This special case is selected because the entire pipe axial acoustic beam 14 is in a single diametral plane, which is relatively easy to visualize. In other cases one may choose to provide two transducers 12a, 12c on each probe head, as depicted in FIG. 4, and to generate two quasi-helical beams that reflect three or more times from the inside of the pipe. It will be recognized that the foregoing discussion of the use of signal return legs and axial spacing transducers is equally applicable to these more difficult to depict geometries.

The reader should realize that the operation of a pair of probes 10a, 10b, such as those shown in FIGS. 2A and 2B, can yield measures of the speed of sound, the probe to probe spacing, and the diameter of the pipe. As noted above, the return leg 20 can be operated to provide a measure of the speed of sound. Once that has been established, it can be used with an average transit time measurement from the axial spacing transducer pair 32a, 32b to yield an accurate probe-to-probe spacing. Given the measured values of the speed of sound and the probe-to-probe spacing, the pipe diameter can be immediately derived from an analysis of the beam geometry.

Figure 3:
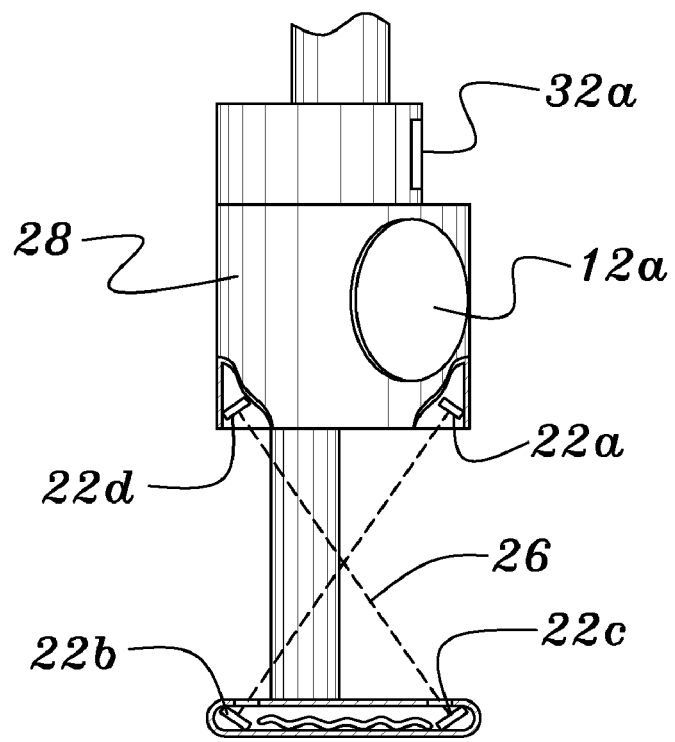
FIG. 3 is partly cut-away detail side view of a probe comprising both a skewed and a head-on transducer.

Turning now to FIGS. 3 and 4, one finds a detailed view of a skewed transducer probe comprising two skewed transducers 12a, 12c, an axial spacing transducer 32a and a return leg 26 comprising four transducers 22a, 22b, 22c, 22d, two of which 22b, 22c are directly electrically interconnected as taught in the inventor's U.S. Pat. No. 7,568,398.

Transit time flow measurements made using probes spaced along a pipe can be subject to an ambiguity that arises because a measured carrier phase difference changes by more than 360° over the range of flows spanned by the instrument. This ambiguity can be resolved by using a signal return leg having a beam 26 with a component directed along the flow direction (e.g., as depicted in FIGS. 3 and 5) that allows one to make a second, independent, determination of flow rate. The return leg measurement is made over a path length that is short enough that there is no ambiguity. Thus, a relatively inaccurate flow rate measurement made at a single probe can be used to improve the overall accuracy of measurement by disambiguating a measurement made over a longer path length.

Uncertainty in the actual pipe diameter can reduce the accuracy of some flow measurements. If a desired output of the measurement system is volumetric flow, an accurately known cross-sectional area is always required. An accurate measure of diameter is also required in transit time measurements that use a pipe axial acoustic beam reflected one or more times off the inside surface 38 of a pipe 16.

As depicted in FIGS. 5 and 6, and taught by the inventor in his U.S. Pat. No. 6,973,842, the internal diameter of a pipe can also be measured by using a separate pair of pipe size measuring transducers 36a, 36b disposed on a single probe and selectively oriented so as to define one or more pipe size measuring beams 40a, 40b in a plane perpendicular to the axis of the pipe. The pipe size measuring beam is configured to comprise multiple reflections, preferably three or four as depicted for two different depth settings of a probe in FIG. 6. As previously noted with respect to the skewed transducer arrangement depicted in FIGS. 2A and 2B, the diameter can be ascertained without providing the dedicated pipe diameter measuring transducers depicted in FIGS. 5 and 6. However, when using a head-on arrangement in which the acoustic beam does not reflect off the pipe wall, additional transducers may be used to measure the pipe diameter.

As previously noted with respect to the skewed transducer arrangement depicted in FIGS. 2A and 2B, the diameter can be ascertained without providing the dedicated pipe diameter measuring transducers depicted in FIGS. 5 and 6. However, when using a head-on arrangement in which the acoustic beam does not reflect off the pipe wall, additional transducers may be used to measure the pipe diameter.

In some cases one or more of the transducers may be used for multiple measurements—e.g., for measuring both diameter and flow rate. For example, in the depiction of FIG. 5 turning the probe 10b a quarter turn about its axis, as indicated by the curved arrow 42, would bring one of the transducers 36a into a setting in which it can send and receive acoustic transmissions along an axial flow measurement path. Alternately, a different selection of the angle of rotation could bring the transducer 36a into a skewed orientation in which it could be used with a paired transducer on an upstream probe to define a quasi-helical acoustic beam reflecting off the inside of the pipe several times.

A method of using the probe depicted in FIG. 5 as one of two probes in a transit time flow measurement could comprise the steps of:

a) using the return leg 20 to measure the speed of sound in the fluid and to obtain a coarse measure of the flow rate;

b) using the pipe size measuring transducers 36a, 36b, in the setting depicted in FIG. 5 to generate a pipe size measuring beam 40 for determining an accurate value of the diameter of the pipe;

c) turning the probe 10b a quarter turn so that one of the transducers 36a has its face set perpendicular to the direction of flow and facing a transducer 12a on an upstream probe 10a to generate an axial acoustic beam 14;

d) measuring the average transit time along the axial beam and combining that value with the measured speed of sound from Step a) to determine the probe-to-probe spacing;

e) measuring the difference in transit times between upstream and downstream propagation along the axial beam to derive a flow rate measurement that is based on the measured values of speed of sound, probe spacing and diameter, but that may be ambiguous; and f) using the previously measured coarse measure of flow rate to disambiguate the flow rate measurement made along the axial path.

Although the present invention has been described with respect to several preferred embodiments, many modifications and alterations can be made without departing from the invention. Accordingly, it is intended that all such modifications and alterations be considered as within the spirit and scope of the invention as defined in the attached claims.

The invention claimed is:

1. A transit time flow sensor for measuring a flow rate of a fluid flowing along a pipe axis, the sensor comprising upstream and downstream probes, each probe comprising at least one respective transducer paired with a respective transducer on the other probe, each pair of transducers operable to define a respective pipe axial acoustic beam extending between the probes when the fluid is present, at least one of the probes further comprising at least one return leg transducer operable, when the fluid is present, to define a return leg acoustic beam having both its ends on the at least one of the probes.

2. The transit time flow sensor of claim 1 wherein the return leg acoustic beam is perpendicular to the pipe axis and extends between the return leg transducer and a reflector.

3. The transit time flow sensor of claim 1 wherein the return leg acoustic beam: comprises a component parallel to the pipe axis and another component perpendicular to the pipe axis; and wherein the return leg beam extends between two return leg transducers.

4. The transit time flow sensor of claim 1 wherein each transducer in the at least one pair thereof is disposed so that the pipe axial beam is parallel to the pipe axis.

5. The transit time flow sensor of claim 1 wherein each transducer in the at least one pair thereof is disposed so that he pipe axial acoustic beam comprises a component transverse to the pipe axis.

6. The transit time flow sensor of claim 5 wherein each probe comprises a respective head portion streamlined along a respective elongation direction and wherein each transducer paired with the respective transducer on the other probe has a center displaced along the flow direction from an axis of the respective probe.

7. The transit time flow sensor of claim 5 wherein each transducer paired with the respective transducer on the other probe is parallel to an axis of the respective associated probe and wherein each probe is rotatable about the respective probe axis.

8. The transit time flow sensor of claim 1 further comprising at least one pipe size measuring transducer disposed on one of the probes and oriented so as to define a pipe size measuring acoustic beam extending perpendicular to the axis of the pipe and reflecting from an internal surface of the pipe.

9. A transit time flow sensor for measuring a flow rate of a fluid flowing in a pipe having a diameter and an axis, the sensor comprising upstream and downstream probes having respective probe axes, each probe comprising a respective head portion streamlined along a respective elongation direction, each head portion respectively comprising at least one flow-measuring transducer skewed with respect to the respective elongation direction by a respective selected skew angle, each flow-measuring transducer operable to define a quasi-helical acoustic beam extending to another flow-measuring transducer on the other probe;

each probe further comprising a respective axial spacing measuring transducer operable to define, with another axial spacing measuring transducer disposed on the other probe, a straight acoustic beam parallel to the axis of the pipe when the respective elongation direction of each probe head is parallel to the pipe axis.

10. The transit time flow sensor of claim 9 wherein at least one of the probes further comprises at least one return leg transducer operable, when the fluid is present, to define a return leg acoustic beam having both its ends on the at least one of the probes.

11. The transit time flow sensor of claim 9 further comprising at least one pipe size measuring transducer disposed on one of the probes and oriented so as to define a pipe size measuring acoustic beam extending perpendicular to the axis of the pipe and reflecting from an internal surface of the pipe.

12. A transit time flow sensor for measuring a flow rate of a fluid flowing in a pipe having a diameter and an axis, the sensor comprising upstream and downstream probes having respective probe axes, each probe comprising a respective head portion streamlined along a respective elongation direction, each head portion respectively comprising at least one flow-measuring transducer having a respective center displaced a respective length along the elongation direction from the respective probe axis and skewed with respect to the respective elongation direction by a respective selected skew angle, each flow-measuring transducer operable to define a quasi-helical acoustic beam extending to another flow-measuring transducer on the other probe;

at least one of the probes further comprising at least one return leg transducer operable, when the fluid is present, to define a return leg acoustic beam having both its ends on the at least one of the probes.

13. The transit time flow sensor of claim 12 wherein the return leg acoustic beam is perpendicular to the axis and extends between a single return leg transducer and a reflector.

14. The transit time flow sensor of claim 12 wherein the return leg acoustic beam comprises a parallel component parallel to the axis and a perpendicular component perpendicular to the axis; the return leg acoustic beam extending between two return leg transducers.

15. The transit time flow sensor of claim 12 wherein each probe comprises a respective axial spacing transducer operable to define, with another axial spacing transducer disposed on the other probe, a straight acoustic beam parallel to the axis of the pipe when the respective elongation direction of each probe head is parallel to the pipe axis.

16. The transit time flow sensor of claim 12 further comprising at least one pipe size measuring transducer disposed on one of the probes and oriented so as to define a pipe size measuring acoustic beam extending perpendicular to the axis of the pipe and reflecting from an internal surface of the pipe.

* * * * *